United States Patent
Pöyhönen et al.

(10) Patent No.: US 6,999,329 B2
(45) Date of Patent: Feb. 14, 2006

(54) TEMPERATURE MONITORING OF PARALLEL-CONNECTED INVERTER MODULES

(75) Inventors: Simo Pöyhönen, Vantaa (FI); Osmo Pasuri, Ojakkala (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/043,188

(22) Filed: Jan. 27, 2005

(65) Prior Publication Data

US 2006/0013025 A1 Jan. 19, 2006

Related U.S. Application Data

(63) Continuation of application No. PCT/FI2004/00321, filed on May 26, 2004.

(30) Foreign Application Priority Data

Apr. 25, 2003 (FI) .................................. 20030632
May 28, 2003 (FI) .................................. 20030809

(51) Int. Cl.
*H02M 7/48* (2006.01)
(52) U.S. Cl. .............................. 363/71; 363/55; 363/95
(58) Field of Classification Search .................. 363/55, 363/56.02, 58, 71, 72, 95, 96, 98
See application file for complete search history.

(56) References Cited

U.S. PATENT DOCUMENTS

| | | | |
|---|---|---|---|
| 5,905,645 A | * | 5/1999 | Cross .......................... 363/65 |
| 6,268,986 B1 | | 7/2001 | Kobayashi et al. .......... 361/24 |
| 6,574,125 B1 | * | 6/2003 | Matsukawa et al. ......... 363/71 |

FOREIGN PATENT DOCUMENTS

| | | |
|---|---|---|
| EP | 0 444 826 | 9/1991 |
| JP | 07194094 | 7/1995 |
| JP | 11055934 | 2/1999 |
| JP | 2000105257 | 4/2000 |

* cited by examiner

*Primary Examiner*—Jeffrey Sterrett
(74) *Attorney, Agent, or Firm*—Dykema Gossett PLLC

(57) ABSTRACT

A method for operating parallel-connected inverter modules, wherein two or more inverter modules (A, B, C) are connected in parallel to feed the same load. Each inverter module has two or more output phases (u, v, w) for supplying electric power into a two or more phase load by determining the temperature ($T_{Au}$, $T_{Av}$, $T_{Aw}$, $T_{Bu}$, $T_{Bv}$, $T_{Bw}$, $T_{Cu}$, $T_{Cv}$, $T_{Cw}$) of each output phase (Au, Av, Aw, Bu, Bv, Bw, Cu, Cv, Cw) in each inverter module, comparing the temperatures of the output phases in each inverter module with the temperatures of the same output phase in other parallel-connected modules, and generating an alarm signal if the temperature of the output phase in an inverter module differs from the temperatures of the same output phase of the other inverter modules more than allowed by a predetermined limit.

6 Claims, 1 Drawing Sheet

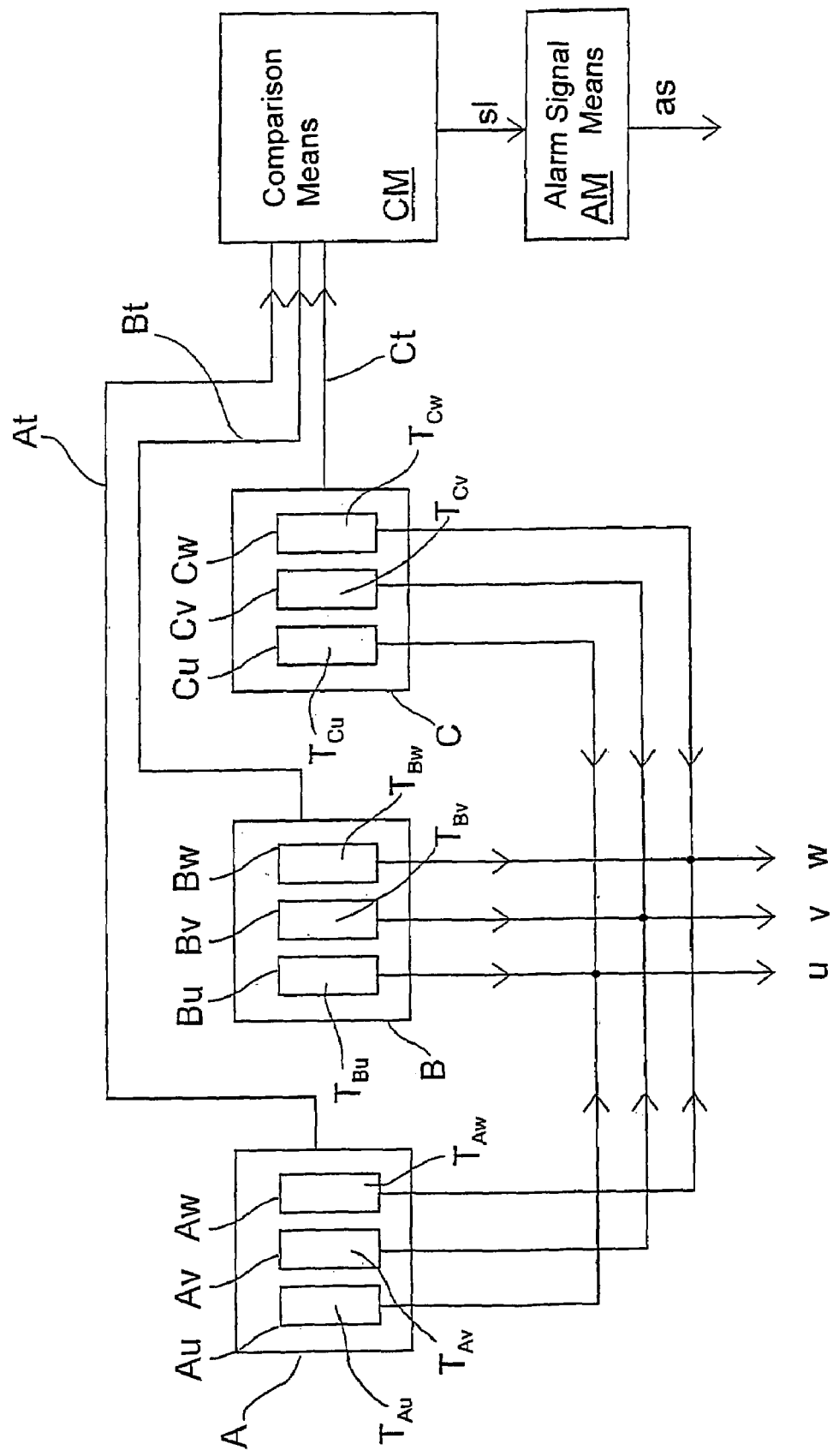

TEMPERATURE MONITORING OF PARALLEL-CONNECTED INVERTER MODULES

CROSS-REFERENCE TO RELATED APPLICATION

This application is a continuation of PCT/FI2004/000321, filed May 26, 2004.

BACKGROUND OF THE INVENTION

The invention relates to a method in connection with parallel-connected inverter modules, disclosed in the preamble of claim 1, and to an arrangement in connection with parallel-connected inverter modules, disclosed in the preamble of claim 5.

Inverters are used in frequency converters to generate a desired voltage or current to a load to be fed. A frequency converter typically receives its supply voltage from an AC network. This voltage is rectified in a rectifier unit and further converted to alternating voltage in the inverter to control the load in a desired manner. A conventional device fed from a frequency converter is a motor, which may be controlled in a reliable manner with the frequency converter using various control and adjustment principles.

As the power demand of motors increases, it is not necessarily reasonable to increase the size and capacity of individual frequency converters correspondingly. It is therefore known to connect frequency converter inverter modules in parallel to obtain the required output power.

Parallel-connection of inverter modules is typically achieved by connecting the same output phase of each parallel-connected module to a common phase supply. In other words, the output phases of each inverter module are connected to the corresponding output phases of other inverter modules. The switching instructions of the frequency converter are generated in a unit common to all the inverter modules, which unit then copies the instructions and sends them to each parallel-connected inverter module. Depending on the power needed, the number of parallel-connected modules may be anything from two upwards.

Inverter modules to be connected in parallel are typically fairly large and therefore placed in separate cabins. These cabins are cooled by blowing air into them to ensure proper operation and performance of the inverters. Today the temperatures of inverter output phases are measured for example directly from a power component of the output phase, or from the immediate vicinity thereof. The measured temperature is compared with a fixed temperature limit and thus, if the temperature rises above the limit, an overload possibly caused to the component is detected.

Prior art component temperature control thus relies on a single temperature measurement, but with this measurement only an overload of the component in question can be concluded with certainty. Other elements having an essential impact on the temperature of the switching component are properly functioning cooling and control of the switch component. Comparing the measured temperature with the fixed temperature limit does not, however, produce clear indication or diagnostic data of such disturbances that may occur.

BRIEF DESCRIPTION OF THE INVENTION

It is an object of the present invention to provide a method and an arrangement that allow the above drawbacks to be avoided and enable a more extensive fault diagnosis than before to be implemented by means of temperature measurements. This is achieved by a method of the invention characterized by what is stated in the characterizing part of independent claim 1 and by an arrangement of the invention characterized by what is stated in the characterizing part of independent claim 5. The preferred embodiments of the invention are disclosed in the dependent claims.

The invention is based on the idea that temperature control of parallel inverter modules is carried out by comparing the temperatures of the same output phases of parallel modules with one another.

The method of the invention provides distinct advantages in fault diagnostics, because in addition to failure indications based, up to present, almost solely on an overload current, failures associated with cooling and with the operation of the control of the power component are now indicated. The failures relating cooling that the invention is capable of detecting include decreased circulation of cooling air, soiling of the cooling components in power semiconductors, and partial or complete breakdown of the cooling fan. In addition, the method enables to detect failures in control electronics, i.e. when one semiconductor component is controlled differently than others, and in power semiconductors, i.e. when a power semiconductor is not conducting or does so in an obscure manner.

The arrangement of the invention provides a simple means for attaining the advantages of the invention.

BRIEF DESCRIPTION OF THE FIGURE

In the following, the invention will be described in greater detail and with reference to the accompanying FIGURE, which is a schematic illustration of the connecting of parallel-connected inverter modules.

DETAILED DESCRIPTION OF THE INVENTION

The FIGURE is a schematic example of parallel-connected three-phase inverter modules A, B, C. Although the FIGURE shows three inverter modules, their number is not restricted thereto, but a required number of parallel modules may be used. Likewise, the number of phases may vary depending on the purpose of use.

Output phases Au, Av, Aw, Bu, Bv, Bw, Cu, Cv, Cw of inverter modules A, B, C are interconnected to produce output u, v, w for the load. The connection has been implemented by connecting the same phases Au, Bu, Cu; Av, Bv, Cv; Aw, Bw, Cw of each module A, B, C together.

In accordance with the method of the invention, temperature $T_{Au}$, $T_{Av}$, $T_{Aw}$, $T_{Bu}$, $T_{Bv}$, $T_{Bw}$, $T_{Cu}$, $T_{Cv}$, $T_{Cw}$ of each output phase of each inverter module is determined. This may be carried out in a conventional manner by direct temperature measurement. Many currently used power semiconductors have a built-in temperature measurement element that allows the temperature to be obtained directly from the semiconductor of the component or from the vicinity thereof. It is also possible to measure temperature from a cooling plate. In addition, it is possible to determine the temperature of components indirectly by calculating it on the basis of the current passing through the component.

In accordance with the invention the temperatures of the output phases of each inverter module are compared with the temperatures of the same output phases of the other modules connected in parallel. With reference to phase u, for example, temperature $T_{Au}$ of phase u of module A is thus compared with temperatures $T_{Bu}$, $T_{Cu}$ of phase u of modules B, C. This is implemented as a cross-comparison between all the modules and, in accordance with the invention, carried out in comparison means CM. As shown in the FIGURE, each inverter module is connected with the comparison means by a signal connection At, Bt, Ct, respectively.

If the comparisons show that the output phase temperature of an inverter module differs from the temperatures of the same phase in other modules by more than allowed by a predetermined limit, an alarm signal as is generated. In the arrangement of the invention this alarm signal is generated by alarm signal means AM. It is apparent that means CM and AM may be implemented in a single circuitry, although in the FIGURE these means are separated by a signal line sl.

Since all the substantially identical parallel inverter modules are controlled by substantially identical controls, the mutually corresponding phases of all modules are subject to substantially equal loads. Moreover, since the inverter modules correspond to each other structurally, ventilation operates in substantially the same way in connection with each module. According to the invention, the temperatures of the same phases are to be compared with each other, whereby decreased ventilation, for example, can be detected with the method of the invention.

The above-described cross-comparison of all temperatures of the same phase is fairly laborious if there is a significant number of parallel-connected modules, because a comparison between the temperatures of the phases of two modules alone does not necessarily provide a reliable result regarding a possible occurrence of failure or symptoms thereof. According to a preferred embodiment of the invention, an average of the temperatures of mutually corresponding output phases of parallel inverter modules is calculated, i.e. according to the example of the FIGURE, temperatures $T_{Au}$, $T_{Bu}$, $T_{Cu}$ determined for phase u are used for calculating average $T_{u\_ave}$ from the equation:

$$T_{u\_ave} = \frac{T_{Au} + T_{Bu} + T_{Cu}}{3}.$$

When the average has been calculated, which according to the arrangement of the invention is carried out by means CM, each phase temperature is compared, in accordance with the embodiment, with the average obtained and if the output phase temperature of one of the inverter modules differs from the average of corresponding output phase temperatures more than allowed by a predetermined limit, an alarm signal is generated. In an embodiment of the arrangement the comparison is carried out by means CM configured for this purpose.

In this embodiment all phase temperatures are further compared with the calculated average of the phase temperatures. However, the method can be further simplified in accordance with the embodiment by selecting the highest temperature among the temperatures of parallel modules in each phase and by comparing this maximum value with the calculated average. Expressed mathematically, maximum temperature $T_{u\_max}$ of phase u is in this embodiment selected using equation $$T_{u\_max} = \max(T_{Au}, T_{Bu}, T_{Cu}),$$

and it is compared with the average using equation $$\frac{T_{u\_max}}{T_{u\_ave}} > T_{limit},$$

where $T_{limit}$ is a predetermined ratio.

If the result of the comparison carried out in means CM is greater than the ratio $T_{limit}$, the alarm signal of the invention is generated by the means for generating an alarm signal in response to a signal of the means CM in signal line sl. The alarm signal as may contain all possible known preventive precautions that aim at reducing the risk of any major failures in the equipment. Such precautions may include an alarm raised to the operator, interruption of the control of the inverter module in question, and possibly a controlled shut-down of the system as a whole.

The invention is described above, by way of example, with reference to a three-phase system having three parallel-connected inverter modules. However, it is evident that the number of both the modules and the switches may be varied according to need and implementation, the method and system of the invention still being applicable.

A person skilled in the art will find it apparent that the basic idea of the invention can be implemented in various ways. The invention and its embodiments are therefore not restricted to the above examples but they may vary within the scope of the claims.

What is claimed is:

1. A method for parallel-connected inverter modules, whereby two or more inverter modules (A, B, C) are connected in parallel to feed the same load, each inverter module (A, B, C) comprising two or more output phases (u, v, w) for supplying electric power into a two or more phase load, the method comprising:

determining the temperature ($T_{Au}$, $T_{Av}$, $T_{Aw}$, $T_{Bu}$, $T_{Bv}$, $T_{Bw}$, $T_{Cu}$, $T_{Cv}$, $T_{Cw}$) of each output phase (Au, Av, Aw, Bu, Bv, Bw, Cu, Cv, Cw) in each inverter module (A, B, C), wherein the method further comprises the steps of:

comparing the temperatures of the output phases in each inverter module with the temperatures of the same output phase in the other parallel-connected modules, and generating an alarm signal if the temperature of the output phase in an inverter module differs from the temperatures of the same output phase of the other inverter modules by more than allowed by a predetermined limit.

2. A method according to claim 1, wherein the comparison of temperatures comprises the steps of:

calculating an average ($T_{U\_ave}$, $T_{v\_ave}$, $T_{W\_ave}$) of the temperatures ($T_{Au}$, $T_{Bu}$, $T_{Cu}$; $T_{Av}$, $T_{Bv}$, $T_{Cv}$; $T_{Aw}$, $T_{Bw}$, $T_{Cw}$) of mutually corresponding output phases of parallel inverter modules (A, B, C), comparing the temperature of each output phase of each parallel inverter module with the average temperature of a corresponding output phase; and generating an alarm signal if the temperature of the output phase of an inverter module differs from the average temperature of the corresponding phase by more than a predetermined limit.

3. A method according to claim 2, wherein the comparison comprises the steps of selecting the maximum value ($T_{U\_max}$, $T_{v\_max}$, $T_{W\_max}$) of the temperatures of each output phase in each parallel inverter module, and comparing this value with the average temperature ($T_{u\_ave}$, $T_{v\_ave}$, $T_{W\_ave}$) of the corresponding output phase.

4. A method according to claim 1, wherein the method also comprises a step of stopping, in response to an alarm signal, at least an inverter module (A, B, C) having a deviating temperature at the output phase.

5. An arrangement of parallel-connected inverter modules, wherein two or more inverter modules (A, B, C) are connected in parallel to feed the same load, each inverter module comprising two or more output phases (u, v, w) for feeding electric power to a load of two or more phases, the arrangement comprising:

temperature determining means for determining the temperature of each output phase ($T_{Au}$, $T_{Av}$, $T_{Aw}$, $T_{Bu}$, $T_{Bv}$, $T_{Bw}$, $T_{Cu}$, $T_{Cv}$, $T_{Cw}$) of each inverter module, wherein the arrangement further comprises comparison means (CM) for determining whether the temperatures of the output phases of each inverter module and the temperatures of the corresponding output phase of the other inverter modules differ by more than a predetermined limit.

6. An arrangement according to claim 5, wherein the arrangement further comprises means (CM) for calculating an average of temperatures of the mutually corresponding parallel inverter modules, the comparison means also being configured to compare the temperature of each output phase of each parallel inverter module with the temperature average of a corresponding output phase.

* * * * *